Jan. 14, 1969    E. S. DAHL    3,421,302
LAWN MOWER GRASS CATCHING BAG
Filed Aug. 29, 1966
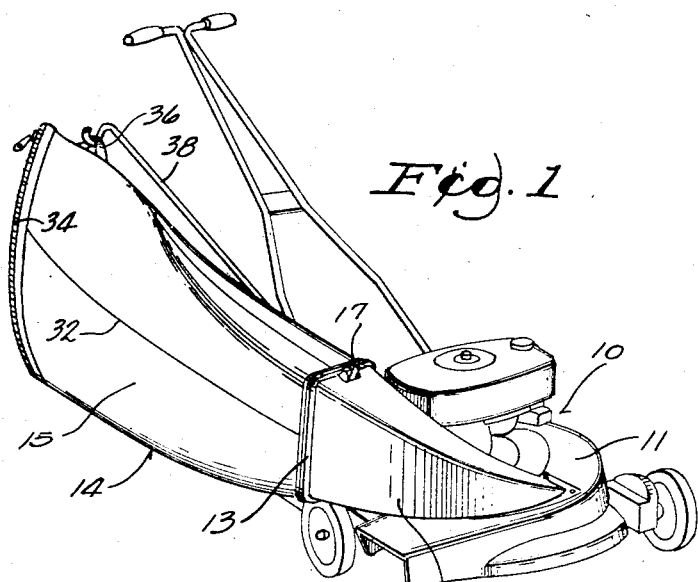
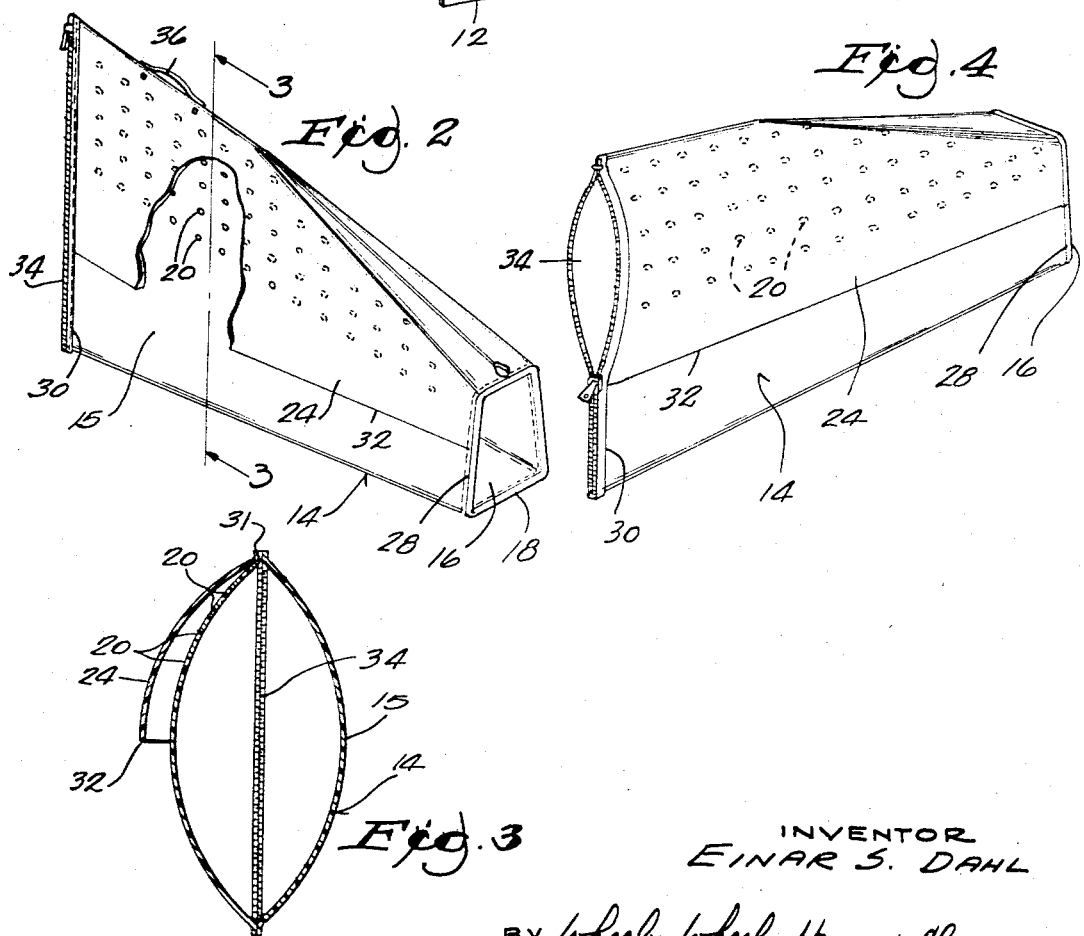
INVENTOR
EINAR S. DAHL
BY Wheeler, Wheeler, House & Clemency
ATTORNEYS United States Patent Office 3,421,302
Patented Jan. 14, 1969

3,421,302
LAWN MOWER GRASS CATCHING BAG
Einar S. Dahl, Galesburg, Ill., assignor to Outboard
Marine Corporation, Waukegan, Ill., a corporation of Delaware
Filed Aug. 29, 1966, Ser. No. 575,620
U.S. Cl. 56—202                              5 Claims
Int. Cl. A01d 35/22; B01d 29/14; A01d 53/06

ABSTRACT OF THE DISCLOSURE

Disclosed herein is a grass collection bag for a rotary mower, which bag includes a sack constructed of air impervious synthetic material which is easily cleaned and not susceptible to rot. The forward end of the bag is adapted for connection to the rotary lawn mower. The sack is provided with an upper perforated wall portion which functions as an air vent for continuous discharge of the air stream coming from the mower. The perforated wall portion or vent is located on the side of the bag opposite the mower operator. The grass catching bag includes a skirt or flap which covers the air vent and which flares outwardly to afford a downward discharge of the air stream.

---

This invention relates generally to grass clipping and debris collection attachments for rotary lawn mowers and more particularly to an air impervious grass catching bag provided with an air exhaust vent having a grit and dust shield.

In the conventional rotary mower adapted for engagement with a grass clipping collection bag, accummulation of clippings and debris is effected by discharge of a high velocity air stream bearing entrained grass clipping and other debris into a collection bag. The air stream is created by the circulating action of the cutting blade in the mower housing.

Desirably there is provided an air vent in the collection bag to promote rearward accumulation of grass clippings and thereby prevent obstruction of the bag inlet. Inasmuch as the air stream created by the mower carries debris including grit, dirt and dust, in addition to grass clippings and other comminuted material, the venting of the air stream creates hazards to the operator. For example, with conventional mower collection bags constructed of relatively loose mesh canvas, grit and dirt escape through the fabric, creating a hazard that may result in eye injury to the mower operator or bystanders.

According to this invention, a collection bag constructed of air impervious material is provided with an air vent comprised of a plurality of perforations in the upper wall of the bag, and preferably on the side away from the mower operator. Grit and dust escaping from the vent are deflected downward by a shield afforded by a skirt or flap which covers the air vent and which flares outwardly from the bag, permitting downward discharge.

Other objects of the present invention are to provide a lightweight bag constructed of inexpensive synthetic material that is durable, easily cleaned, and not susceptible to rot or mildew. The collection bag of the present invention can be constructed of transparent synthetic material to permit observation of the degree of grass clipping accummulation in the bag.

Further objects and advantages of the invention will be apparent from the following description and the accompanying drawings in which:

FIGURE 1 is a perspective view of a collection bag which is attached to a rotary mower and which embodies various of the features of the invention;

FIGURE 2 is a front end and side perspective view of the bag shown in FIGURE 1;

FIGURE 3 is a sectional view of the bag shown in FIGURE 2 taken along line 3—3; and FIGURE 4 is a rear end and side perspective view of the bag shown in FIGURE 1.

Referring now to the drawings, FIGURE 1 shows a rotary lawn mower designated generally 10. The rotary mower has a cutter housing 11 provided with a discharge chute 12 having an outlet 13. The mower may have any suitable engine or motor. Inasmuch as the engine and housing form no part of the present invention, they are not illustrated or described in further detail. A collection bag 14 in accordance with the present invention is shown in FIGURE 1 connected to the rotary mower 10. The bag 14 comprises a sack 15 which has a mouth 16 adapted for communication with chute outlet 13. The bag 14 is attachable to the chute 12 by a releasable connection means 17 which engages a wire frame 18 about the mouth 16 of the sack 15. The air stream laden with grass clippings and other comminuted material is discharged from the cutter housing 11 into chute 12 and enters collection bag 14 through mouth 16.

The sack 15 also includes an air vent to promote rearward accumulation of grass clippings. In the disclosed construction the air vent comprises a plurality of spaced perforations 20 which are desirably located on the upper wall portion of the sack to prevent obstruction or clogging caused by grass accummulation. The perforations also are desirably located on the wall away from the operator.

The collection bag 14 also includes a shield 24 which comprises a skirt or flap that overlays the air vent. In the disclosed construction the skirt is secured to the bag by a heat seal along the upper edge 31 and along vertical edges 28 and 30 of the bag. The lower edge of the skirt 32 is free and permits the skirt to flare outwardly as a result of air discharged through perforations 20. The skirt directs and deflects downwardly away from the operator any grit, dust, or other debris leaving the bag through the perforations and permits the continuous air stream from the mower housing to escape into the atmosphere.

The bag 14 is provided with a zipper outlet 34 which facilitates removal of grass clippings. In the disclosed construction a strap 36 is provided to engage a supporting rod 38. Various alternate means may be used to connect and support the bag, but they form no part of the present invention and are not illustrated in detail.

The sack or bag can be constructed of any flexible air impervious material and can be constructed of one piece or of two pieces with longitudinal seams at the upper and lower horizontal edges 31 and 40 joining the two pieces.

Various of the features of the invention are set forth in the following claims.

The embodiments of the invention in which an exclusive property or privilege is claimed are defined as follows:

1. In a rotary mower having a blade housing with a grass discharge outlet in said housing and a handle for guiding mower movement, the improvement in combination therewith comprising an elongated air impervious sack of flexible synthetic material having an interior for accumulation of grass clippings and debris and having an inlet connected to said housing outlet, said sack being located adjacent to said handle, said sack having a closeable outlet and an upper side wall portion on the side of said sack opposite from said handle, said upper side wall portion being provided with a plurality of perforations affording communication of said bag interior with the atmosphere and said sack having a longitudinal skirt on the outside of said sack overlaying said perforations said skirt having an upper horizontal edge secured to said sack and a free lower horizontal edge to afford discharge of air downwardly from the bag interior.

2. A grass clipping and debris collection bag for a rotary lawn mower comprising an elongated air impervious sack having an upper edge and a mouth adapted for connection to a rotary mower, a closeable outlet, an upper perforated wall portion on the side of said sack disposed for location opposite the lawn mower operator, and a longitudinal skirt on the outside of said sack over said perforated wall portion, said skirt being secured to said sack adjacent to the upper edge and having a free lower horizontal edge.

3. A collection bag in accordance with claim 2 wherein said skirt has vertical edges secured to said sack.

4. A collection bag in accordance with claim 2 wherein said sack and said skirt are constructed of a heat sealable material and said skirt has an upper edge heat sealed to said sack.

5. In a rotary mower having a blade housing and a grass discharge chute, and a handle for guiding mower movement, the improvement in combination therewith comprising an elongated air impervious sack having a muoth connected to said chute, said sack being located adjacent said handle and having a closeable outlet at the end of said sack opposite said mouth and having an upper side wall portion on the side of said sack opposite said handle, said upper side wall portion being provided with a plurality of perforations extending from adjacent said mouth to adjacent said closeable outlet and said sack having a shield on the outside of said sack, overlaying said perforations and having an upper horizontal edge and two vertical edges secured to said sack and a free lower horizontal edge.

References Cited

UNITED STATES PATENTS

| | | | |
|---|---|---|---|
| 1,403,112 | 1/1922 | Ford | 55—364 |
| 1,802,228 | 4/1931 | Witte | 55—364 X |
| 1,881,086 | 10/1932 | Marshall | 55—364 X |
| 2,577,863 | 12/1951 | Sosnowich | 55—376 |
| 2,870,954 | 1/1959 | Kulesza | 229—62.5 |
| 2,918,694 | 12/1959 | Tarrant | 55—369 X |
| 2,970,422 | 2/1961 | Kroll et al. | 56—202 |
| 3,008,284 | 11/1961 | Bright | 56—25.4 |
| 3,118,267 | 1/1964 | Shaw | 56—25.4 |
| 3,143,842 | 8/1964 | Mattson et al. | 56—202 |
| 3,199,277 | 8/1965 | Moody | 56—25.4 |
| 3,257,151 | 6/1966 | Sparkling | 55—417 X |

OTHER REFERENCES

Veith-Kunststoffwerk, printed Netherlands application (A) No. 292,199, July 1965.

HARRY B. THORNTON, *Primary Examiner.*

D. E. TALBERT, Jr., *Assistant Examiner.*

U.S. Cl. X.R.

55—364, 369, 376, 378, 381, 385; 229—53; 150—2